United States Patent [19]

Dingler

[11] Patent Number: 4,593,645

[45] Date of Patent: Jun. 10, 1986

[54] METHOD AND APPARATUS FOR CLEANING A REUSABLE LITTER CONTAINED WITHIN A LITTER BOX

[76] Inventor: Hermann P. A. Dingler, 4328 Villa Dr. #2, Cincinnati, Ohio 45242

[21] Appl. No.: 729,806

[22] Filed: May 2, 1985

[51] Int. Cl.[4] ............................................. A01K 23/00
[52] U.S. Cl. ....................................................... 119/1
[58] Field of Search .................................... 119/1, 22

[56] References Cited

U.S. PATENT DOCUMENTS

| 2,523,615 | 9/1950 | Fell | 119/22 |
| 2,585,698 | 2/1952 | Spring | 119/22 |
| 2,956,565 | 10/1960 | Anderson | 119/1 X |
| 2,971,493 | 2/1961 | Robb | 119/1 |
| 3,762,369 | 10/1973 | Barnum | 119/1 |

*Primary Examiner*—Hugh R. Chamblee
*Attorney, Agent, or Firm*—Frost & Jacobs

[57] ABSTRACT

A method and apparatus for cleaning a reusable litter in a pet animal litter box which utilizes a relatively heavy non-porous, non-absorbent gravel litter material which is cleansed of animal excrements in the litter box. The excrements are dispersed in a volume of water which is rapidly transferred from a first to a second compartment of the litter box to remove the dispersed waste materials.

15 Claims, 8 Drawing Figures

METHOD AND APPARATUS FOR CLEANING A REUSABLE LITTER CONTAINED WITHIN A LITTER BOX

TECHNICAL FIELD

The invention relates generally to litter boxes such as used for cats and other pet animals and more particularly concerns a pet litter box which may be used to clean a non-disposable litter contained within the box.

BACKGROUND OF THE INVENTION

Many people throughout the world keep domesticated animals as pets within their homes. Many times these animals have only limited access to spaces outside the home or are otherwise unable to readily access an outdoor location for excreting waste materials on a regular basis. Consequently, it is necessary for the homeowners to make provisions which allow the animal to eliminate excretion products inside the home.

The most typical type of facility for cats or other small pet animals is a litter box. In its simplest and most common form, a litter box is formed from a relatively inexpensive open-sided container filled with commercially purchased litter material. The box, which may be an open-sided corrugated cardboard box, has a floor with four vertically upstanding side walls, which side walls function to contain the litter material within the box. The litter material is generally an unconsolidated granular mixture. Various types of natural and synthetic materials, both organic and inorganic, have been used in the past for litter materials.

In the past, it has been necessary to replace the litter in such litter boxes on a frequent and regular basis. Since the prior art litter has generally been disposable, the relatively high cost of commercially available litter has produced economic pressure to delay changing of the litter material as long as practically possible. Toward this end, the manufacturers of prior art litter materials have sought to make them absorbent, odor masking and bacteriostatic. Nevertheless, if the cat or other pet animal uses the litter on a regular basis, replacement of the litter material is required at least on a weekly basis.

In addition to the relatively high cost of continually replacing the litter material, disposal of the used litter is generally viewed as an unsanitary and undesirable task. In fact, for many persons, the undesirability of disposing of used litter represents a more serious disadvantage than the cost of replacement litter.

There have been several attempts in the prior art to eliminate the expense and unpleasantness of changing animal litter. For the most part, these efforts have been directed toward the composition of the litter material itself. However, no material has ever been developed which completely absorbs animal excretions or which renders such excretions odorless or sanitary. While attempts have been made to remove animal excretions, most of these attempts have been directed toward large-scale commercial ventures and have not proved practical in a home environment. Those devices which have been designed for small-scale home use have, for the most part, had other practical problems. For example, in U.S. Pat. No. 2,204,416 to Kramer an animal toilet is provided which automatically flushes in response to the movement of an animal from the excretion area.

SUMMARY OF THE INVENTION

Accordingly, it is a primary object of the present invention to provide a more pleasant method of removing animal pet excretion materials from a litter box.

It is another object of the present invention to provide a method of cleaning a reusable litter material while the litter material is in a litter box.

It is yet another object of the present invention to provide a sanitary method of providing clean fresh litter material to a litter box without touching or contacting the litter material.

A correlated object of the invention is to provide a litter box for cleaning and removing excretion materials from a reusable litter material.

Additional objects, advantages and other novel features of the invention will be set forth in part in the description that follows and in part will become apparent to those skilled in the art upon examination of the following, or may be learned with the practice of the invention. The object and advantages of the invention may be realized and obtained by means of the instrumentalities and combinations particularly pointed out in the appended claims.

To achieve the foregoing and other objects, and in accordance with the purposes of the present invention as described herein, an improved method of cleaning a pet litter box having first and second compartments with a gravel bed covering the floor of the first compartment includes directing pressurized water against the gravel in the first compartment to separate any excretion material from the gravel. The first compartment of the litter box is filled to a predetermined level with water with the water being agitated to disperse the separated excretion material within the water. With the excretion material so dispersed, lateral support of the volume of water in the first compartment is rapidly abandoned to transfer the water to a second or flash accumulator compartment of the litter box. The water and excretion materials are then drained from the second compartment for discharge into a sewer system.

In accordance with another aspect of the invention, an improved litter box for recyclable litter material is provided. The litter box is a multi-compartment container having a floor and a plurality of vertically upstanding side walls. The side walls are sealingly interconnected to the floor for laterally supporting a volume of water in the container. A vertically upstanding partition wall divides the container into first and second compartments. This partition is operative to selectively laterally support a volume of liquid in the first compartment. Means are provided for rapidly abandoning lateral support of the volume of water supported in the first compartment to rapidly transfer that water to the second compartment without transferring a layer of gravel covering the floor of the first compartment. A drain is provided for permitting the flow of liquid out of the second compartment.

In a further aspect of the invention, the floor of the first compartment is angled downwardly toward the partition wall and means are provided for slowly draining water from the lower end of the first compartment floor. This slow draining means is independent of the lateral support abandoning means.

In a more specific aspect of the invention, a separation between the partition wall and the container floor is used for slowly draining the water from the first compartment floor.

In another specific aspect of the invention, the means for rapidly abandoning lateral support of the water includes an opening in the partition wall, a flap valve selectively closing the partition opening and preventing fluid flow therethrough, and means for moving the flap valve to permit fluid flow through the partition opening.

In yet another aspect of the invention, the flap valve is movable between predetermined open and closed positions. A resilient seal is interposed between the flap valve and the partition wall when the flap valve is in the closed position for sealing about the partition opening.

According to one specific aspect of the invention, the flap door is pivotally mounted to the partition wall.

In still another aspect of the invention, the partition opening is vertically spaced from the container floor for draining of water from the first compartment and the portion of the partition wall below the opening is operative to prohibit transfer of the gravel to the second compartment.

In a further feature of the invention, the top of the first compartment is an open unrestricted space.

According to another aspect of the invention, the top portion of one of the side walls is cut out to provide improved access to the interior of the first compartment.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and that several details are capable of modification in various, obvious aspects, all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of this specification illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
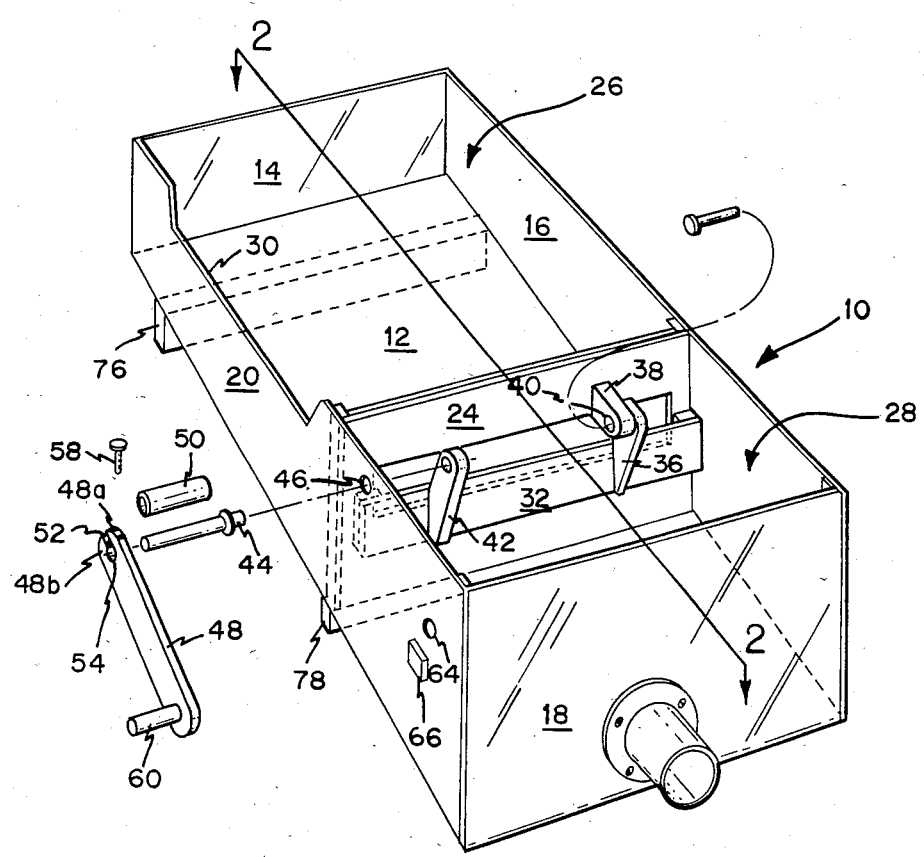
FIG. 1 is an exploded perspective view of a pet animal litter box constructed in accordance with the principles of the present invention.

Referring now to the drawings, FIG. 1 depicts a pet animal litter box, generally designated with the numeral 10, which is constructed in accordance with the principles of the present invention. The illustrated litter box 10 includes a generally horizontal and planar floor 12 completely surrounded by a plurality of vertically upstanding side walls 14, 16, 18 and 20, which side walls 14, 16, 18 and 20 are substantially perpendicular to and extend from the periphery of the floor 12. As depicted in FIG. 1, the side walls 14 and 18 are in spaced, substantially parallel relationship to each other and in substantially perpendicular relationship to the side walls 16, 20. The side walls 16,20 are also in spaced, parallel relationship to each other and adjoin the side walls 14,18 at opposite ends. The side walls 14, 16, 18 and 20 are sealingly interconnected to the floor 12 to enable the litter box 10 to laterally support a volume of liquid. As illustrated, the litter box 10 is open at the top of the side walls 16, 18, 20 and 22 with the area above the floor 12 being substantially unrestricted. For convenience of description only, the side wall 14 will occasionally be described as the front wall and the side wall 18 will occasionally be described as the rear wall.

A partition wall 24 extends between the side walls 16 and 20 and divides the litter box 10 into a first or pet compartment 26 and a second or flash accumulator compartment 28. The partition wall 24 is sealingly interconnected to the side walls 16 and 20 at the respective interfaces between the partition wall 24 and the side walls 16,20. For reasons which will become apparent from the description below, the side wall 20 has a cutout portion 30 in which the vertical height of the side wall 20 is reduced. This cutout portion 30 is limited to only a portion of the length of the side wall 20 extending between the side wall 14 and the partition wall 24.

Figure 2:
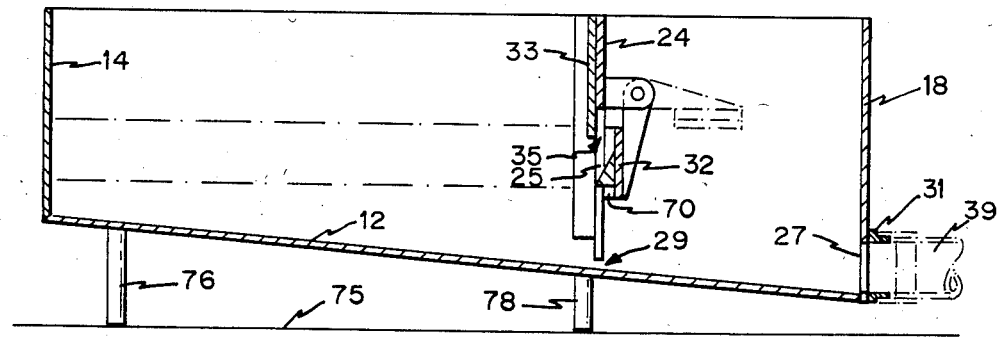
FIG. 2 is a side elevational view, partially in cross-section, of the pet animal litter box depicted in FIG. 1.
Figure 5:
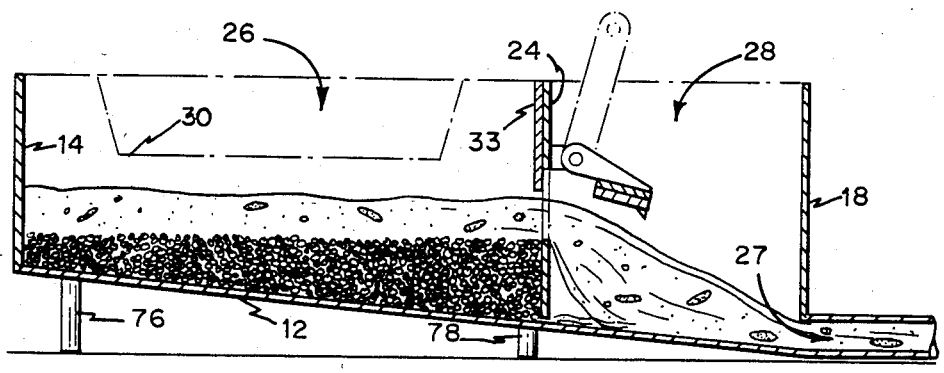
FIG. 5 is a sectional view similar to FIG. 4 depicting the lateral transfer of water from the first to a second compartment of the litter box following the opening of a flap valve.

As more clearly seen from FIGS. 2 and 5, the partition wall 24 has a horizontally elongated opening 25 for selectively permitting fluid flow between the first and second compartments 26 and 28. A flap valve 32 is pivotally secured to the flash compartment side of the partition wall 24 for movement between opened and closed positions. In the closed position, as illustrated in the solid line depiction of FIG. 2, the flap valve 34 sealingly engages the partition wall 24 to partially block the partition opening 25 and to inhibit fluid flow therethrough. When pivotally moved to the open position illustrated in the phantom line depiction of FIG. 2, flap valve 34 allows free fluid flow through the partition opening 25. The flap valve 32 is pivotally secured to the partition wall 24 by a hanging hinge 36, which hanging hinge 36 is rigidly attached to the flap valve 32 proximal to one end of the flap valve 32 (the right side of the FIG. 1 depiction). In turn, the hanging hinge 36 is pivotally interconnected to a boss 38 affixed to the partition wall 24. This pivotal interconnection is through a hinge pin 40.

A lever hinge 42 is rigidly secured proximal to the other end of the flap valve 32 (the left side of FIG. 1). This further lever hinge 42 is fixedly secured to a hinge pin 44 which extends through an aperture 46 in the side wall 20. The opposite end of this hinge pin 44 (which is external to the second compartment 28) is attached to a lever 48 disposed outside of side wall 20. A rubber sleeve 50 is snuggly fitted about the portion of the hinge pin 44 extending through side wall 20 in sealing relationship with both the hinge pin 44 and the side wall aperture 46.

Figure 6:
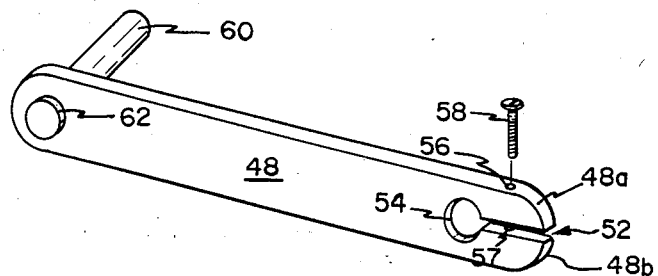
FIG. 6 is an enlarged perspective view of the lever and handle depicted in FIG. 1.

The lever 48 has a split 52 (as seen in FIGS. 1 and 6) at one end which bifurcates that end into end segments 48a and 48b. The slit 52 terminates in an aperture 54, which aperture 54 receives the outboard end of the hinge pin 44. A clamp screw 58 extends through axially aligned threaded apertures 56 and 57 in end segments 48a and 48b respectively, to urge the end segments 48a and 48b together and to apply a radially compressive clamping force against the hinge pin 44 for securing the lever 48 thereto. A lever handle 60 is affixed to the opposite end of the lever 48 (distal to the aperture 54). This handle 60 extends outwardly from the lever 48 for use in manually rotating lever 48 about the axis of hinge pin 44. As most clearly illustrated in FIG. 6, a cylindrical engagement pin 62 extends from the inside surface of this same end of lever 48. When the lever 48 is shifted toward the side wall 20, the engagement pin 62 is selectively insertable into a lock hole 64 (FIG. 1) extending through the side wall 20. A lever stop 66 extends outwardly from the side wall 20 for limiting counterclockwise rotation of the lever 48. As those skilled in the art will readily appreciate from the drawings and the foregoing description, the lever handle 60 is used to manually rotate the lever 48, and this rotation of lever 48 is used to move the flap valve 32 between its open and closed positions. Further, when the flop valve 32 is in the closed position, engagement pin 62 may be inserted into lock hole 64 to inhibit accidental rotation of the lever 48 and unintentional opening of the flap valve 32.

Figure 3:
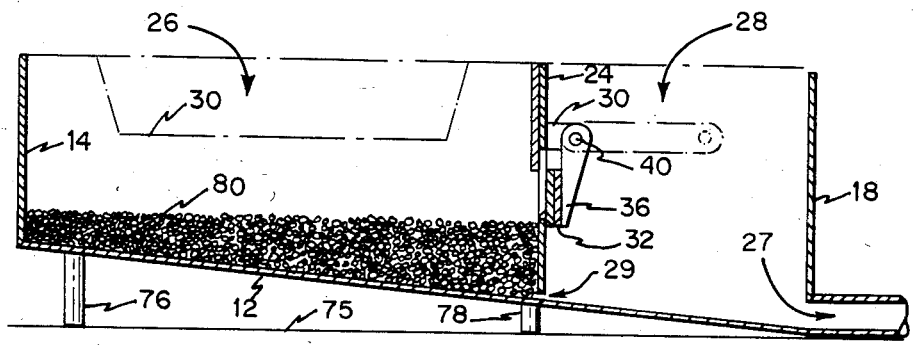
FIG. 3 is a side elevational view similar to FIG. 2, but depicting a gravel bed in one of the compartments of the litter box.
Figure 4:
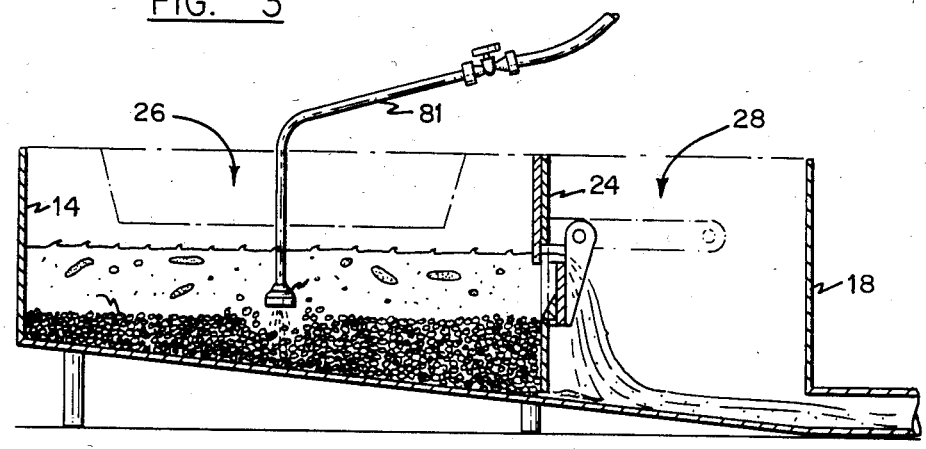
FIG. 4 is a sectional view similar to FIG. 3, but showing the first compartment of the litter box supporting a volume of water.
Figure 7:
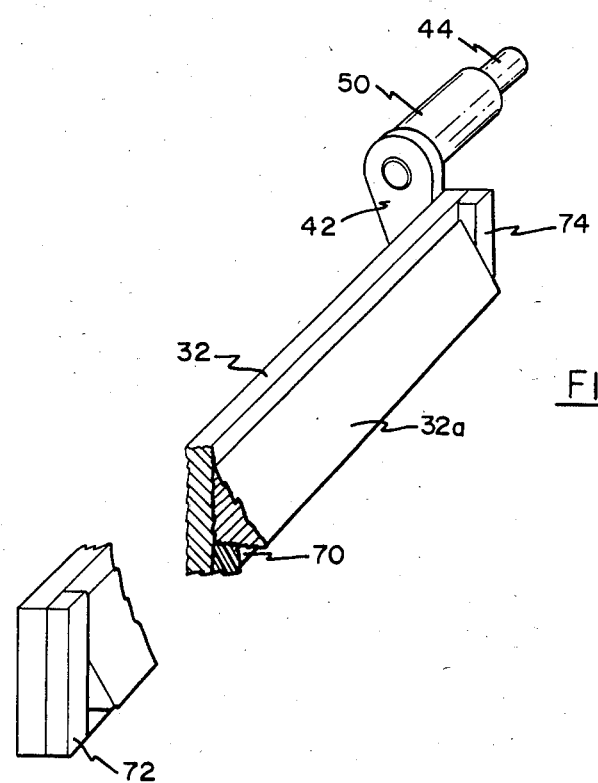
FIG. 7 is a perspective view of the flap valve used for selectively closing and opening the partition opening of FIGS. 1 and 2.

Turning now to FIG. 7, the flap valve 32 is shown in greater detail. In the illustrated embodiment, the engagement side of the flap valve 32 includes a flap nose 32a having a generally triangular cross-sectional configuration to allow the bottom portion of the flap valve 32 to sealingly engage the partition wall 24 while maintaining the top of the flap valve 32 in spaced relationship to this same partition wall 24. The flap nose 32a has a horizontal length to correspond with the length of the partition opening 25. When the flap valve 22 is in its closed position (as illustrated in FIGS. 1, 3, and 4) the bottom and side surfaces of the flap nose 32a engage the corresponding bottom and side surfaces of the partition opening 25 to form a primary seal about the partition opening 32. Secondary resilient seals, formed of rubber or other suitable material, are secured to the flap valve 32 below and to the sides of the flap nose 32a. In the illustration of FIG. 7, the bottom seal is designated by the numeral 70, with the side seals being designated by the numerals 72 and 74.

From the sectional view of FIG. 2, it can be seen that the litter box floor 12 is supported upon and elevated above a dwelling floor or other support surface 75 by a pair of spacers 76 and 78. Moreover, it will be noted from this drawing that the illustrated spacer 76 is larger than the spacer 78 so as to orient the litter box 12 at an angle with respect to the supporting surface 75. In the shown construction, the floor 12 angles continuously downward from the front to the rear sides (14 to 18) with the lowest area of the first or pet compartment 26 being adjacent to the partition wall 24. The downward slope of the floor continues in the second compartment with the lowest part of the second compartment 20 beng adjacent to the rear side 10. A drain opening 27 is provided through the bottom rear side 18, which opening 27 is in fluid communication with a drain nipple 29 secured to the exterior of the rear wall 18. It may also be observed that a slight opening 29 is provided between the bottom of the partition wall 24 and the floor 12. In the preferred embodiment, this opening 29 is approximately 1/32 to 1/16 inch.

The operation of the illustrated litter box is most easily explained in connection with FIGS. 3-5. As shown at FIG. 3, a gravel bed 80 is placed over the floor 12 of the first compartment 26. Preferably the gravel forming this bed 80 is formed from an unconsolidated mixture of granular particles, each of which has an overall dimension between 1/16 and ¼ inch and has a specific weight of at least 0.07 lbs/cu.in. This gravel bed 80 preferably has a depth of approximately 1½ inches.

With the flap valve 32 locked in the closed position of FIG. 3, the litter box 10 is positioned on a basement or laundry floor or other suitable location in a pet owner's house where the pet will have convenient access. The pet, such as a domesticated house cat, can then enter (and subsequently exit) the first compartment 26 through the access provided by the cut out opening 30. Once inside the first compartment 26, the pet can excrete its bodily waste onto the unconsolidated mixture of gravel provided by bed 80. When this biological function is completed, the pet may, as is conventional for cats, rearrange the gravel bed 80 by scratching the gravel particles in an attempt to bury the excreted materials. The side walls 14, 16 and 20, and the partition wall 24, help to contain the gravel particles in the first compartment during such a contingency.

In order for the litter box 10 to be successful, the materials chosen for the gravel and the size of the gravel material used must be accepted by the pet for the intended excretion function. It is also desirable, in contrast to conventional litter boxes, that the litter materials be relatively non-porous and non-absorbent. These characteristics enhance the ability to reuse the litter material in accordance with one of the many advantages afforded by the invention. Applicant has found that commercially availing aquarium gravel, typically formed from silicone, fulfills each of the above-mentioned requirements and may be used successfully.

Figure 8:
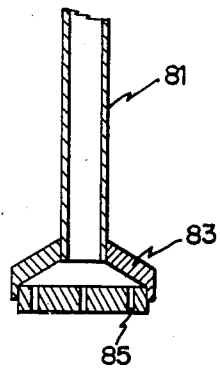
FIG. 8 is a sectional view of one type of nozzle which may be used for directing a pressurized stream of water against the gravel bed.

After the pet has used the litter box 10 for excretion, the pet owner may remove the excrements without contacting the then contaminated gravel particles within the bed 80. This is accomplished in the illustrated embodiment by opening a valve of a household water source (not shown) and directing a pressurized spray against the gravel bed 80, as depicted in FIG. 4. One spray head for attaching to the end of a household hose and so directing the pressurized spray against the gravel bed 80 is illustrated in FIG. 8, where a ⅜ inch copper pipe 81 supports a spray head 83 at its outboard end for discharging water through a plurality of apertures 85. Alternatively, any of many commercially available hose spray nozzles may be used for this purpose. Detergent may also be advantageously added to the first compartment 26 prior to or simultaneously to the introduction of water for improved cleaning action.

Directing a pressurized water spray against the gravel accomplishes several purposes. First of all, the impingement force of the pressurized spray separates and removes any dried fecal material from the gravel particles. Secondly, with flap valve 32 in the closed position of FIG. 3, the first compartment 26 will fill up with water, as depicted in FIG. 4. Thirdly, as the water level rises in the first compartment 26, the pressurized spray will agitate water contained within the first compartment 26 and keep the separated excrements dispersed in the water.

As the water level in the first compartment 26 reaches the top of flap valve 34, excess water above that level will flow beneath an overflow shield 33 and discharge over the flap valve 32 to the second compartment 28 through an overflow opening 35 between the flap valve 32 and the partition wall 24. As depicted in FIG. 4, discharging access accumulated water from the first compartment 26 in this manner will insure that contaminated water from the first compartment 26 will not overflow onto the pet owner's floor.

After the water level in the first compartment 26 reaches a predetermined level defined by the overflow opening 35, the engagement pin 62 is removed from the lock hole 64 (by slight lateral shifting of the lever 48) and the lever 48 is rapidly rotated in the counterclockwise direction to move the flap valve 32 to the open position shown in FIG. 5. Opening the flap valve 32 rapidly in this way quickly removes lateral support for the volume of water contained within the first compartment 26, and causes most of the contained water to be immediately laterally tansferred to the second compartment 28. With the resulting quick lateral discharge of water to the second compartment 28, the excrements which were dispersed in the contained or accumulated volume of water in the first compartment 26 are also discharged to the second compartment 28. However, due to their relatively high specific weight, the gravel particles of bed 80 do not disperse in the accumulated water in the first compartment 26. Consequently, they are not laterally discharged through the partition opening 32 when the lateral support of the contained water is suddenly abandoned. Once in the second compartment 28, the water and all of the dispersed waste material are drained out to a sewer system through the opening 27, drain nipple 31 and a hose 39 connected thereto. It will be appreciated that the second compartment 28 functions as a surge tank to rapidly receive the water discharged from the first compartment 26. Thus, water may be discharged from the first compartment 26 at a rate which greatly exceeds the discharge capacity of the drain opening 27 or any conduit downstream thereof. It will also be appreciated that any water in the first compartment 26 below the partition opening 25 which is not discharged through the opening 25 will be slowly drained to the second compartment independently of the partition opening 25 through the opening 29, which opening 29 is located below the partition wall 24. Water discharging through opening 29 at the relatively slow discharge rate is depicted in FIGS. 3 and 4. Preferably, the opening 29 is smaller than the gravel particles in bed 80 so as to prevent any discharge of the gravel through opening 29.

If desired, the above-described operation may be repeated.

In summary, numerous benefits have been described which result from employing the concepts of the invention. Significantly, the litter material used by the present invention is reusable, and need not be replaced after cleansing. This reusable litter material is cleansed within the litter box with all of the excrements being separated from the gravel particles and removed to a sewer system. If desired, cleaning materials, such as detergents, may be added to the water in the first compartment during the cleaning process for improved cleansing action. The invention requires only a source of household pressurized water and access to a sewage system. The procedure involved in cleaning the litter box of the present invention removes much of the unpleasantness associated with the cleaning of prior art litter boxes and permits the litter box to be cleaned rapidly and thoroughly without touching either the litter box or the contaminated litter material contained therein.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, instead of using a plurality of discreet side wall sections as depicted in the preferred embodiment, it may be possible to construct a cylindrically shaped litter box. Accordingly, as used in the appended claims, the term "plurality of side walls" or words of similar import will be construed as including a single continuous side wall which encloses a floor from a plurality of directions. It may also be desirable to mount a movable carriage to the sidewalls of the litter box and to fix a pressure nozzle thereto for directing the pressurized spray against the gravel bed. The embodiment was chosen and described in order to best illustrate the principles of the invention in its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method of cleaning animal excrements and other waste materials from litter within a pet litter box having first and second compartments with a gravel bed covering the floor of the first compartment, comprising steps of:
    (a) directing pressurized water against the gravel bed in the first compartment to separate any fecal or other waste material from the gravel;
    (b) filling the first commpartment to a first predetermined level with water and agitating the water to disperse the separated waste material into the water;
    (c) rapidly abandoning lateral support of the water in the first compartment and laterally transferring the water in the first compartment to the second compartment while the dispersed waste material is dispersed in the water without transferring the gravel litter; and
    (d) draining the water and waste material from the second compartment;

2. A method as recited in claim 1, wherein the step of rapidly abandoning lateral support includes opening a flap valve in a partition dividing the first and second compartments.

3. A method as recited in claim 2, wherein the rapidly abandoning step further includes manually rotating a lever to open the flap valve in the partition.

4. A method as recited in claim 2, wherein the step of directing pressurized water against the gravel includes manually directing pressurized water discharged from a hose toward the gravel litter bed.

5. A recyclable litter box for pets, comprising
    (a) multi-compartment container having a floor and a plurality of upstanding side walls, said side walls being sealingly interconnected to the floor for laterally supporting a volume of liquid in the compartments;

(b) a vertically upstanding partition wall dividing the container into first and second compartments, said partition being operative to selectively laterally support a volume of liquid in the first compartment;

(c) a layer of gravel covering the floor;

(d) means for rapidly abandoning lateral support of a volume of liquid supported in the first compartment to rapidly transfer the liquid to the second compartment without transferring the gravel; and (e) a drain for permitting the flow of liquid out of the second compartment.

6. A recyclable litter box as recited in claim 5, wherein the floor of the first compartment is angled downwardly toward the partition wall, and further including means independent of the lateral support abandoning means for slowly draining water from the lower end of the first compartment floor.

7. A recyclable litter box as recited in claim 6, wherein said independent means includes a separation between the partition wall and the container floor.

8. A recyclable litter box as recited in claim 7, wherein the rapidly abandoning means includes an opening in the partition, a flap valve selectively closing the partition opening and permitting fluid flow therethrough and means for moving the flap valve to permit fluid flow through the partition opening.

9. A recyclable litter box as recited in claim 8, wherein the flap valve is movable between predetermined open and closed positions, and further including a resilient seal interposed between the flap valve and the partition wall when the flap valve is in the closed position for sealing about the partition opening.

10. A recyclable litter box as recited in claim 9, wherein the flap valve is pivotally secured to the partition wall.

11. A recyclable litter box as recited in claim 9, wherein the partition opening is vertically spaced from the container floor and the portion of the partition wall below the opening is operative to inhibit transfer of the gravel to the second compartment.

12. A recyclable litter box as recited in claim 11, wherein the top of the first compartment is an open unrestricted space.

13. A recyclable litter box as recited in claim 12, wherein the top of a portion of one of the side walls is cut out to provide improved access to the interior of the first compartment.

14. A recyclable litter box as recited in claim 5, wherein the gravel has a specific weight of at least 0.07 lbs/cu.in.

15. A recyclable litter box as recited in claim 14, wherein the gravel bed is formed from a plurality of solid fragments having an overall dimension between approximately 1/16 inch and ¼ inch.

* * * * *